UNITED STATES PATENT OFFICE.

HUGO KOLKER, OF BRESLAU, PRUSSIA, GERMANY.

INCRUSTATION-PREVENTIVE.

SPECIFICATION forming part of Letters Patent No. 258,235, dated May 23, 1882.

Application filed January 6, 1882. (No specimens.)

*To all whom it may concern:*

Be it known that I, HUGO KOLKER, a subject of the King of Prussia, Emperor of Germany, residing at Breslau, in the Kingdom of Prussia and Empire of Germany, manufacturer, have invented a new and useful Composition of Matter for the Prevention and Removal of Incrustations in Steam-Boilers, of which the following is a specification.

I boil in a convenient vessel catechu of Pegu, fifty-five pounds; English white caustic soda, of sixty to sixty-two per cent., forty-five pounds; dried pomegranate-shell, three pounds, and fresh water, six hundred pounds, to such a degree as to produce a homogeneous solution, which then is filtered. In this lye are, by boiling them, dissolved fifty pounds of dried and coarse-pulverized chestnuts, and then still adding to the so-obtained mixture four hundred pounds of fresh water in order to produce a specific weight of 1.045 to 1.055, when my incrustation-preventive will be ready. This incrustation-preventive, added in proportionate doses—about two (2) pounds for fresh water and four (4) pounds for salt-water for every forty (40) cubic feet capacity of water-space—to the water of the steam-generator, produces the following effects: The vegetable substances of the chestnuts—viz., thirty-seven and seventy-six one-hundredths per cent. of starch, twenty-three per cent. of dextrine, seventeen and sixty-seven one-hundredths per cent. of sugar, one and seventy-one one-hundredths per cent. of fat, and nine per cent. of azotic substances, which, dissolved in alkaline lye, are decomposed, and, brought in combination with tannic acid, exert a fermentative action—form, with the lime-salts of the feed-water, amylates, which transform the sulphate of lime and the other lime-salts of the feed-water to carbonate of lime. At the same time the so-transformed lime-salts are separated by the fermentative action of the solution of chestnuts in muddy or gelatinous state. By so doing the formation of gypsum is made impossible and all lime-salts are brought in muddy or gelatinous form.

I am aware that prior to my invention compositions consisting of catechu, caustic soda, and pomegranate-shells have been used in incrustation-preventives; but I am not aware that chestnuts have been used for this purpose.

What I claim, and desire to secure by Letters Patent, is—

The herein-described composition of catechu of Pegu, English white caustic soda, dried pomegranate-shell, dried and coarse-pulverized chestnuts, and fresh water, in the proportions specified, and for the purpose substantially as set forth.

HUGO KOLKER.

In presence of—
HANS KOTTAS,
JAMES RILEY WEAVER.